(12) United States Patent
Paquet et al.

(10) Patent No.: US 7,220,106 B2
(45) Date of Patent: May 22, 2007

(54) FRANCIS WHEEL AND HYDRAULIC MACHINE COMPRISING ONE SUCH WHEEL

(75) Inventors: Francois Paquet, Champagnier (FR); Bernard Michel, Vaulnaveys le Bas (FR)

(73) Assignee: Alstom Technology Ltd., Baden (CH)

( * ) Notice: Subject to any disclaimer, the term of this patent is extended or adjusted under 35 U.S.C. 154(b) by 105 days.

(21) Appl. No.: 10/527,688

(22) PCT Filed: Sep. 12, 2003

(86) PCT No.: PCT/FR03/02707

§ 371 (c)(1),
(2), (4) Date: Mar. 11, 2005

(87) PCT Pub. No.: WO2004/025116

PCT Pub. Date: Mar. 25, 2004

(65) Prior Publication Data

US 2006/0018754 A1    Jan. 26, 2006

(30) Foreign Application Priority Data

Sep. 13, 2002  (FR) .................................. 02 11382

(51) Int. Cl.
*B63H 1/16*  (2006.01)
(52) U.S. Cl. .................. 416/183; 416/185; 416/198 A; 416/DIG. 2; 415/208.3

(58) Field of Classification Search ............... 415/206, 415/208.3; 416/183, 185, 198 A, DIG. 2, 416/DIG. 5
See application file for complete search history.

(56) References Cited

U.S. PATENT DOCUMENTS

| | | | | |
|---|---|---|---|---|
| 1,509,653 A | * | 9/1924 | Kaplan | 416/248 |
| 1,929,098 A | | 10/1933 | Moody | |
| 3,610,775 A | * | 10/1971 | Swearingen | 416/186 R |
| 3,874,819 A | * | 4/1975 | Tamura et al. | 416/186 R |
| 4,108,570 A | * | 8/1978 | Yamabe | 416/186 R |
| 4,479,757 A | * | 10/1984 | Holmes et al. | 416/186 R |
| 6,135,716 A | * | 10/2000 | Billdal et al. | 416/183 |

FOREIGN PATENT DOCUMENTS

| | | | |
|---|---|---|---|
| DE | 281 316 C | | 6/1926 |
| JP | 58160560 A | * | 9/1983 |
| JP | 61101680 | | 5/1986 |
| JP | 63075362 A | * | 4/1988 |

* cited by examiner

*Primary Examiner*—Igor Kershteyn
(74) *Attorney, Agent, or Firm*—Dowell & Dowell, P.C.

(57) ABSTRACT

A Francis runner that includes a crown, a band and blades which extend between the crown and the band. An angle ($\beta_{24}$) between a linear speed (U, $D_{224}$) of one of the blades and a median of the blade at the trailing edge, has a value between 20 and 25°. As a result, a machine utilizing the Francis runner of the invention is efficient, while an equivalent power under high load is high.

9 Claims, 6 Drawing Sheets

FRANCIS WHEEL AND HYDRAULIC MACHINE COMPRISING ONE SUCH WHEEL

BACKGROUND OF THE INVENTION

1. Field of the Invention

The invention relates to a Francis runner and to a hydraulic machine equipped with such a runner.

Francis runners can equip different sorts of hydraulic machines, such as turbines, pumps, or pump-turbines. They comprise blades distributed about a central rotating shaft and define therebetween channels for flow of water. The geometry of the blades of these runners is defined so that the flow of the water induces a torque on the runner, in the case of a turbine, or so to transmit a movement to the fluid, in the case of a pump. The power that a hydraulic machine equipped with such a runner can deliver depends on its geometry and on the type of heads with which it is associated. In this way, the power that a turbine can deliver may be brought to a reference value defined by the equivalent power delivered by a turbine of the same geometry working under 1 metre of head and whose runner outlet diameter is 1 metre. This power $P_{11}$ depends in particular on the speed of rotation $N_{11}$ of the turbine under the same conditions.

2. Description of the Related Art

As is visible in FIG. 6, an optimal working point A may be defined in a system of coordinates giving the power $P_{11}$ of a turbine, under the aforementioned conditions, as a function of the speed of rotation $N_{11}$ under the same conditions. There is defined as power under high load $P_{11FC}$, the power of the turbine for an efficiency less by 3.5% than the efficiency at point A. In the reference system $P_{11}$ on $N_{11}$, curves $I_{99}$, $I_{98}$, $I_{97}$, etc. of constant values of the efficiency obtained with a turbine are defined. Furthermore, there is defined a noteworthy point B of the same abscissa as point A and for which the power obtained is equal to $P_{11FC}$.

There is defined as equivalent power under high load $P_{11FC}$, the power obtained under the conditions of point B for each turbine.

As shown in FIG. 7, present-day turbines have equivalent powers under high loads $P_{11FC}$ which, in a representation as a function of the speed $N_{11}$ mentioned hereinabove, lie in a first zone $Z_1$, which shows that the equivalent power under high load $P_{11FC}$ increases as a function of the speed $N_{11}$. It is sometimes necessary to obtain relatively high equivalent powers under high loads. In particular, in the case of rehabilitation of an existing installation, the speed $N_{11}$ is imposed, this in practice limiting the power values $P_{11FC}$ that may be obtained with a conventional turbine.

Up to the present time, equivalent power zones under high loads of relatively high values with respect to the speed $N_{11}$ have not been really explored by the designers of hydraulic machines, as solutions degraded from the technical/economical standpoint were expected.

SUMMARY OF THE INVENTION

The present invention takes the opposite view to this prejudice of the person skilled in the art by exploring the ranges of values of flowrates, of powers and of speeds of the hydraulic machines corresponding approximately to zone $Z_2$ in FIG. 7. It has proved that a judicious choice of certain characteristics of the turbine runner makes it possible to obtain solutions offering a better level of efficiency, as will appear from the following explanations.

In this spirit, the invention relates to a Francis runner which comprises a crown, a band and blades extending between this crown and this band, these blades-defining between themselves channels for flow of liquid. This runner is characterized in that the angle between the linear speed of progress of one of the blades and the median line of that blade at the level of its trailing edge, has, in the vicinity of the point of attachment of the blade on the band, a value included between 20 and 25°.

Thanks to the invention, the orientation of the trailing edge of the blades with respect to their linear direction of progress is sufficiently important for a considerable flowrate of liquid to be able to transit via the runner, this making it possible to attain power values notably higher than those known in the machines of the state of the art, without degrading the efficiency of the machine.

According to advantageous but non-obligatory aspects of the invention, this runner incorporates one or more of the following characteristics:

Over the length of the trailing edge of the blade, the angle between the linear speed and the aforementioned median line has a maximum value less than 34°.

Over the length of the trailing edge of the blade, the angle between the linear speed and the aforementioned median line has an average value included between 20 and 30°.

Over the length of the leading edge of the blade, the mean angle between the linear speed and the median line of this blade at the level of the leading edge has a value included between 70 and 120°.

The angle between the linear speed and the aforementioned median line has, in the vicinity of the point of attachment of the blade on the band, a value included between 70 and 120°.

The overlap angle between the leading edge and the trailing edge of the blade has, viewed in a direction parallel to the axis of rotation of the runner:

at the level of the band, a value less than 25°.
at the level of the crown, a value less than 37° and
on average, over the length of the leading and trailing edges, a value less than 31°.

The band has a meridian section such that its minimum diameter over the central third of its height is less by at least 2% with respect to the diameter of the band at the level of the points of attachment of the trailing edges of the aforementioned blades.

The invention also relates to a hydraulic machine of Francis type which comprises a runner as described previously. Such a machine may be constituted by a turbine adapted to deliver an equivalent power under high loads, under 1 metre of head and with a runner outlet diameter of 1 metre, expressed in kilowatts, such that its ratio with the speed of rotation of the turbine under the same conditions, expressed in rpm, has a value included between 0.16 and 0.175. Surprizingly, such a machine has a satisfactory efficiency, in the ranges of $N_{11}$ usually used.

BRIEF DESCRIPTION OF THE DRAWINGS

The invention will be more readily understood and other advantages thereof will appear more clearly in the light of the following description of a form of embodiment of a Francis turbine according to the invention, given solely by way of example and made with reference to the accompanying drawings, in which.

DESCRIPTION OF THE EMBODIMENT

Figure 1:
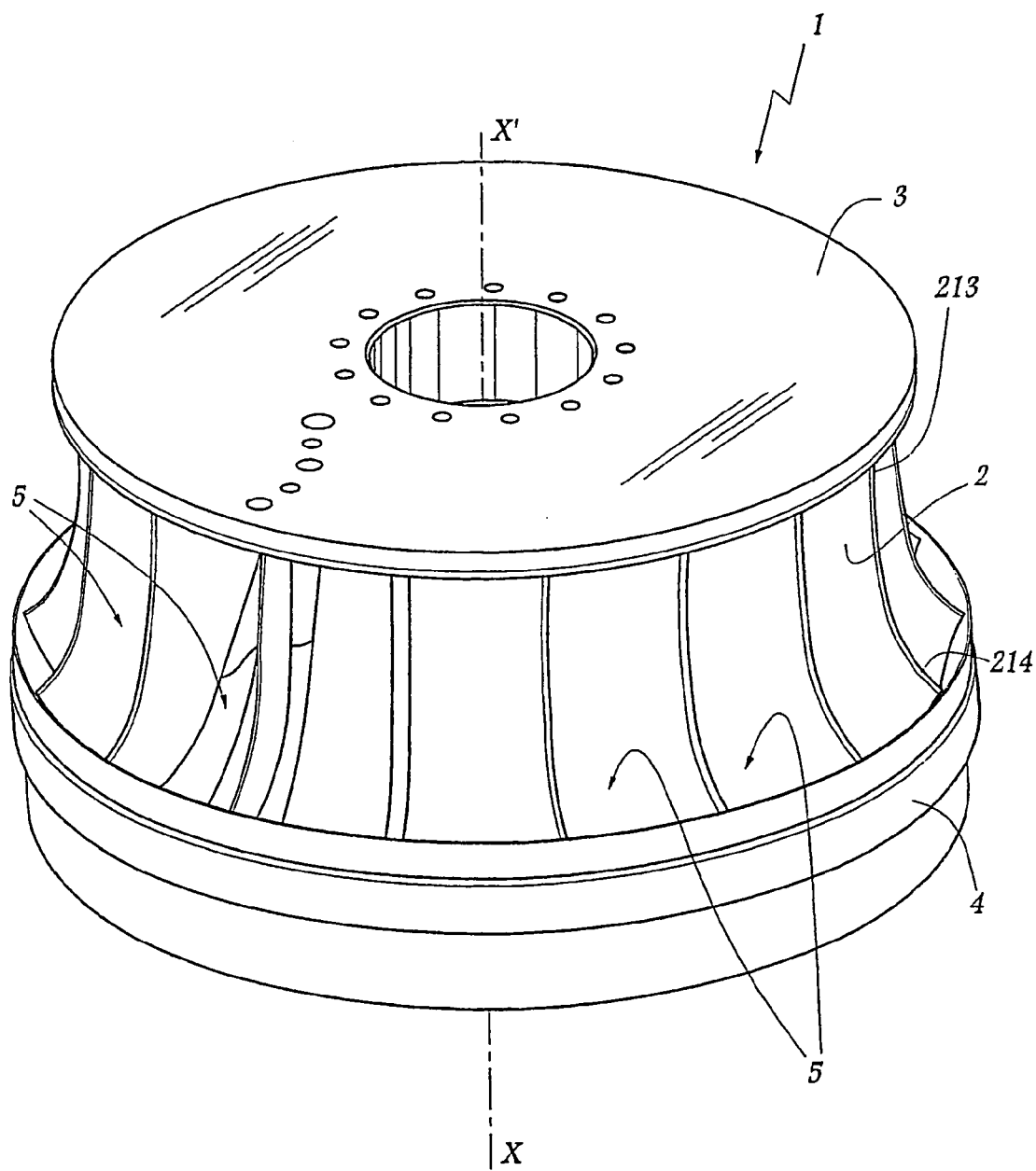
FIG. 1 is a view in perspective of a Francis turbine runner according to the invention.

The runner 1 shown in FIGS. 1 to 5 comprises identical blades 2 distributed about a central axis X–X' of rotation of the runner 1. A crown 3 is provided in the upper and internal radial part of the runner 1, while a band 4 borders the lower, radial and external part of the blades 2. A flow channel 5 is thus defined between each pair of two adjacent blades, this channel being bordered by the crown 3 and the band 4.

The blade 2 includes a leading edge 21 and a trailing edge 22. A junction 213 is formed between the edge 21 and the crown 3. Another junction 214 is formed between the edge 21 and the band 4. A further point of junction 223 is formed between the edge 22 and the crown 3 and another point of junction 224 is formed between the edge 22 and the band 4.

Figure 2:
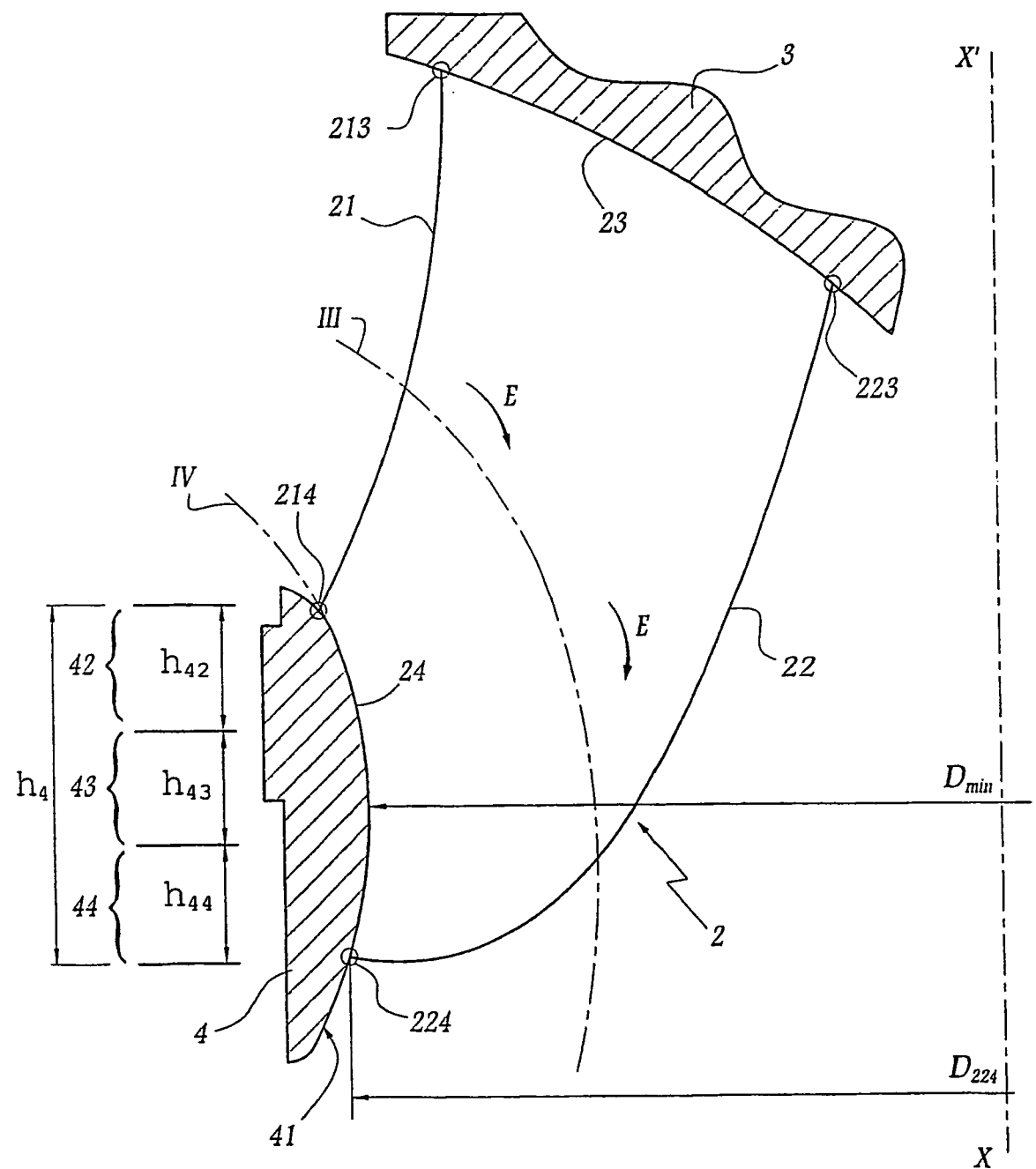
FIG. 2 is a meridian half-section of the runner of FIG. 1.

The line III in FIG. 2 represents the meridian trace of a sheet of axisymmetrical flow along the blade 2. Arrows E represent this flow.

Figure 3:
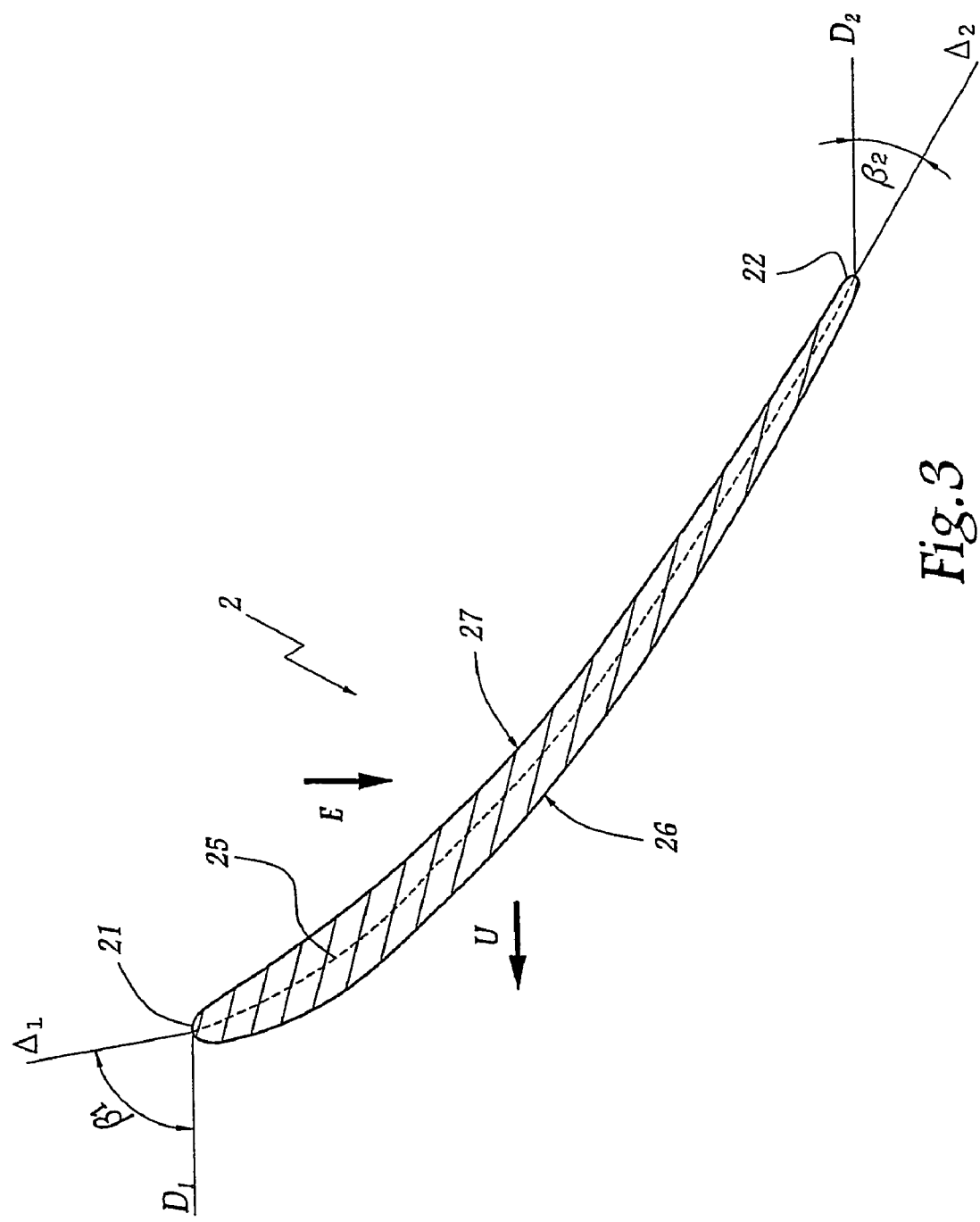
FIG. 3 is a developed section of the profile of the blade shown in FIG. 2 along line III.

In the representation of FIG. 3, the flow E is globally perpendicular to the direction of the speed U of linear progress of the blade 2 whose value is equal to the number of revs per minute made by the runner 1 multiplied by π and by the nominal diameter of the runner.

A surface of junction 23 is formed between the blade 2 and the crown 3, this surface including points 213 and 223. Furthermore, 24 denotes the surface of junction between the blade 2 and the band 4, this surface including points 214 and 224. An imaginary curved surface corresponding to the median line of the blade 2 is shown at 25, i.e. to a surface located at equi-distance from the lateral faces 26 and 27 of the blade 2. The trace of the surface 25 in the plane of FIG. 3 is a curve equi-distant from the lateral faces 26 and 27.

$\Delta_1$ denotes a straight line passing through the leading edge 21 and extending the median line 25 in the plane of FIG. 3. $\beta_1$ denotes the angle between this straight line $\Delta_1$ and a straight line $D_1$ parallel to the speed U and passing through the leading edge 21.

In the same way, $\Delta_2$ denotes a straight line extending the median line 25 at the level of the trailing edge 22 of the blade 2 and $D_2$ a straight line parallel to the speed U at the level of this trailing edge. $\beta_2$ denotes the angle between the straight lines $\Delta_2$ and $D_2$.

It will be understood that, taking into account the essentially non-planar nature of the blades 2, the values of the angles $\beta_1$ and $\beta_2$ are variable over the length of the leading edge 21 and trailing edge 22.

Figure 4:
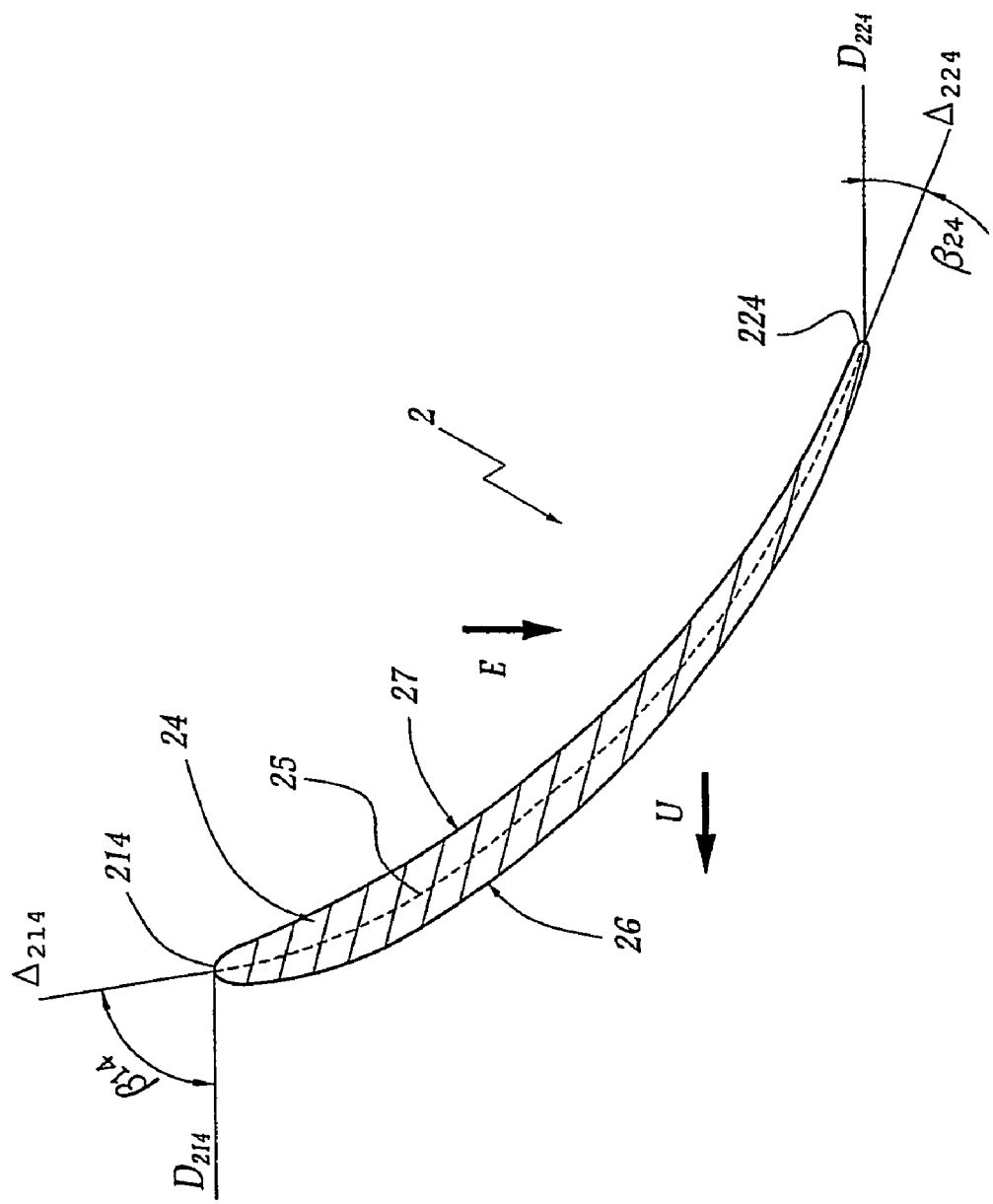
FIG. 4 is a section similar to FIG. 3 in the zone of join between the blade and the band, along line IV in FIG. 2.

As is more particularly visible in FIG. 4, the value of the angle $\beta_{24}$ corresponding to the angle $\beta_2$ at the level of point 224, is included between 20 and 25°, in practice equal to 21° in the example shown. The angle $\beta_{24}$ is the angle between a straight line $\Delta_{224}$ extending the median line 25 to point 224 and a straight line $D_{224}$ parallel to the speed U and passing through that point.

An angle $\beta_{14}$, corresponding to angle $\beta_1$ at the level of point 214, is defined between a straight line $D_{214}$ parallel to speed U and passing through that point and a straight line $\Delta_{214}$ extending the median line 25 on that point. The value of this angle $\beta_{14}$ is included between 70 and 120° and, preferably, of the order of 85° as shown in FIG. 4.

In practice, each blade 2 is designed and made so that the maximum value of the angle $\beta_2$, over the length of the trailing edge 22, is less than 34°. A mean value of this angle $\beta_2$ may also be defined, taken over twenty five streams of flow equally distributed between the crown 3 and the band 4. This mean value is preferably included between 20 and 30°.

Thanks to these values of the angle $\beta_2$, the flow at the level of the trailing edge 22 may take place with a relatively high flowrate, without reduction of the efficiency of the runner 1.

Similarly, the mean value of the angle $\beta_1$ over the length of the leading edge 21, taken under the same conditions, is included between 70 and 120°.

Figure 5:
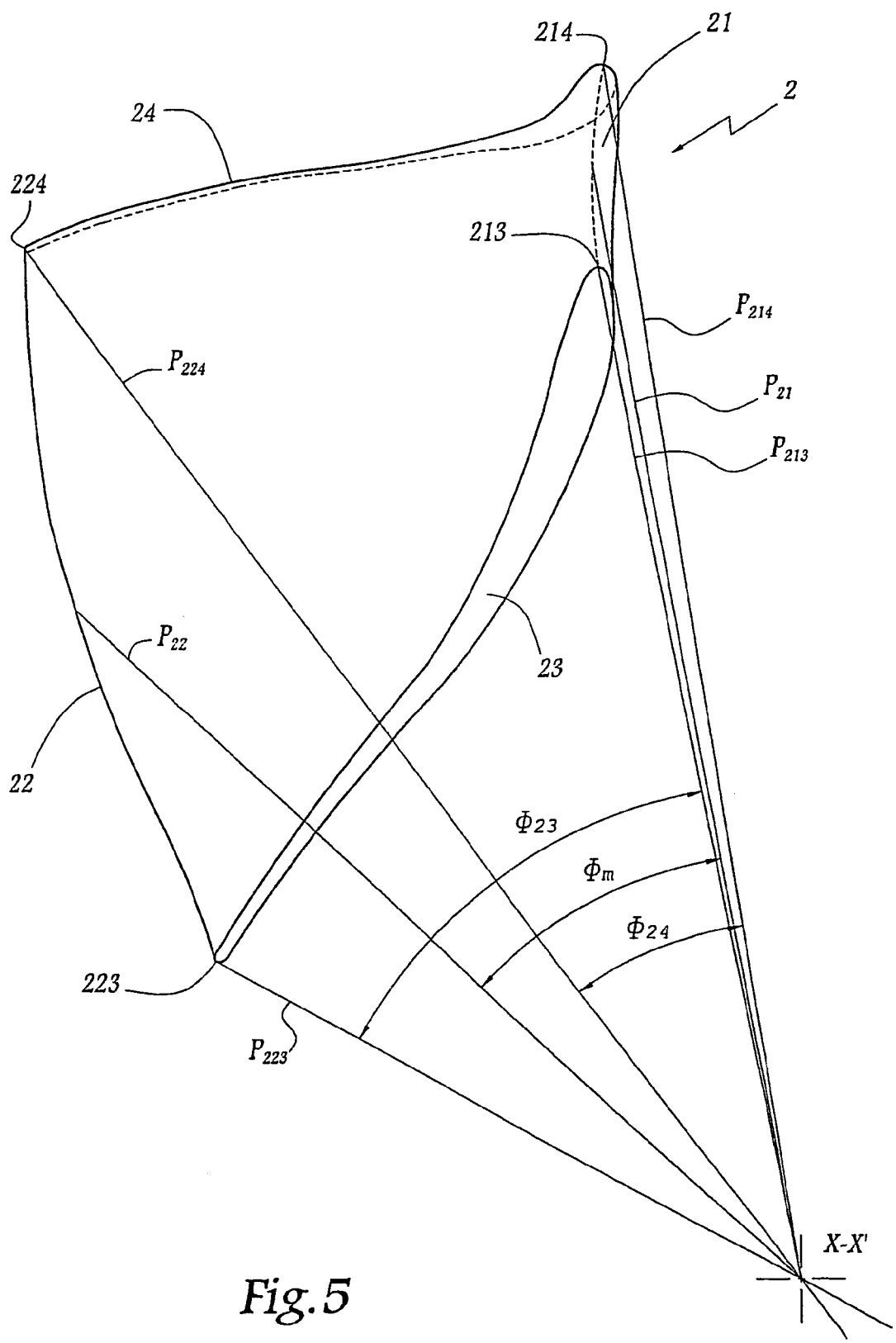
FIG. 5 is a plan view from above of the blade shown in FIGS. 2 to 4, the crown and the band having been omitted to render the drawings clearer.
Figure 6:
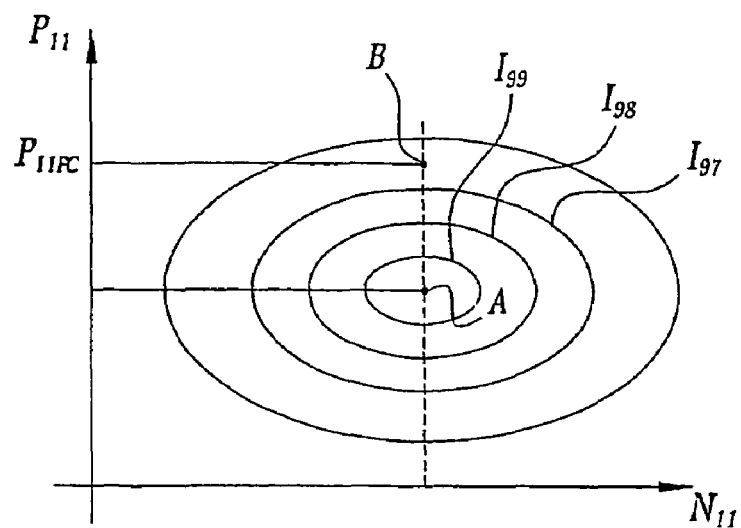
FIG. 6 schematically shows the curves of constant efficiency as a function of the equivalent power of a turbine and of the speed of rotation under the conditions mentioned hereinabove.
Figure 7:
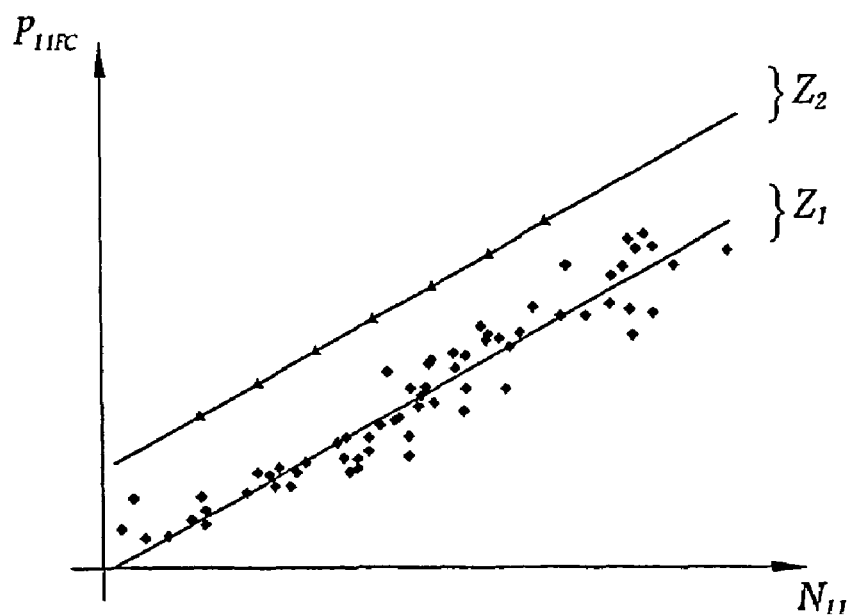
FIG. 7 is a schematic representation of the distribution of the equivalent powers under high load ($P_{11FC}$) of different turbines as a function of their speeds of rotation under the aforementioned conditions.

Referring to FIG. 5, the overlap angle $\phi_{24}$ of the blade 2 at the level of the band 4 may also be defined as being the angle between a plane $P_{224}$ passing through axis X–X' and through point 224 and a plane $P_{214}$ passing through axis X–X' and through point 214.

In the same way, the overlap angle $\phi_{23}$ of the blade 2 at the level of the crown 3 is defined as being the angle between a plane $P_{223}$ passing through axis X–X' and through point 223 and a plane $P_{213}$ passing through axis X–X' and through point 213.

In order to optimize the flow of the water in the channels 5, the value of $\phi_{24}$ is chosen to be less than 25°, while the value of $\phi_{23}$ is chosen to be less than 37°. In addition, a mean value of the angle of overlap between the leading and trailing edges of the blade 2 over the length of these edges may be defined by forming the average of 25 values of angles $\phi$ between planes $P_{22}$ passing through the axis X–X' and successive points distributed equally over the trailing edge 22 and planes $P_{21}$ passing through axis X–X' and successive points distributed equally over the leading edge 21. In practice, the mean value $\phi_m$ of this angle is chosen to be less than 31°.

As is more particularly visible in FIG. 2, the band 4 may be divided into three bands 42, 43 and 44 whose unitary height $h_{42}$, $h_{43}$ and $h_{44}$ is equal to one third of the total height $h_4$ of the band 4. Considering the intermediate band 43 of the band 3, its minimum internal diameter $D_{min}$ can be defined, which is in fact the minimum diameter of the surface 41. The diameter $D_{224}$ of the surface 41 at the level of point 224 can also be defined.

In practice, the ratio of $D_{min}/D_{224}$ is less than 0.98, which corresponds to the fact that the minimum diameter is smaller by at least 2% than the diameter $D_{224}$.

The invention claimed is:

1. A Francis runner comprising:
   a crown;
   a band; and
   blades extending between said crown and said band such that a leading edge of each of said blades has points of attachment with said crown and said band and a trailing edge of each of said blades has other points of attachment with said crown and said band, said blades defining between themselves channels for flow of liquid and being rotatable with said crown and said band in a direction defined by a linear component (U), and each of said blades has oppositely oriented lateral faces which are spaced equidistant from an imaginary curved median line extending from said leading edge to said trailing edge;

wherein an angle ($\beta_{24}$) between the direction defined by the linear component (U) of each of said blades and a straight line ($\Delta_{224}$) extending from the median line of each of said blades at said trailing edge thereof, has, at said point of attachment of each of said blades on said band, a value between 20 and 25°.

2. The runner according to claim 1, wherein, over a length of said trailing edge of each of said blades, an angle ($\beta_2$) between said direction defined by the linear component (U) and a straight line ($\Delta_2$) extending from the median line of each of said blades at said trailing edge thereof has a maximum value less than 34°.

3. The runner according to claim 1, wherein, over a length of the trailing edge each of said blades, an angle ($\beta_2$) between said direction defined by the linear component (U) and a straight line ($\Delta_2$) extending from the median line of each of said blades at said trailing edge thereof has an average value between 20 and 30°.

4. The runner according to claim 1, wherein, over a length of the leading edge of each of said blades, an angle ($\beta_1$) between said direction defined by the linear component (U) and a straight line ($\Delta_1$) extending from the median line of each of said blades at said leading edge thereof has a value between 70 and 120°.

5. The runner according to claim 1, wherein an angle ($\beta_{14}$) between said direction defined by the linear component (U) and a straight line ($\Delta_{214}$) extending from the median line of each of said blades at said leading edge thereof has, in the vicinity of said point of attachment of each of said blades on said band, a value between 70 and 120°.

6. The runner according to claim 1, wherein an overlap angle between said leading edge and said trailing edge of each of said blades has, viewed in a direction parallel to an axis of rotation (X–X') of the runner:
- at said band, a value ($\phi_{24}$) less than 25°;
- at said crown, a value ($\phi_{23}$) less than 37°; and
- on average, over lengths of said leading and trailing edges, a value ($\phi_m$) less than 31°.

7. The runner according to claim 1, wherein said band has a meridian section such that a minimum diameter ($D_{min}$) of said band over a central third of a height ($h_4$) of said band is at least 2% less with respect to a diameter ($D_{224}$) of said band at said points of attachment of said trailing edges of said blades on said band.

8. A hydraulic machine of Francis type equipped with a runner, said runner comprising:
- a crown;
- a band; and
- blades extending between said crown and said band such that a leading edge of each of said blades has points of attachment with said crown and said band and a trailing edge of each of said blades has other points of attachment with said crown and said band, said blades defining between themselves channels for flow of liquid and being rotatable with said crown and said band in a direction defined by a linear component (U), and each of said blades has oppositely oriented lateral faces which are spaced equidistant from an imaginary curved median line extending from said leading edge to said trailing edge;

wherein an angle ($\beta_{24}$) between the direction defined by the linear component (U) of each of said blades and a straight line ($\Delta_{224}$) extending from the median line of each of said blades at said trailing edge thereof, has, at said point of attachment of each of said blades on said band, a value between 20 and 25°.

9. The hydraulic machine according to claim 8, further comprising a turbine delivering an equivalent power under high load ($P_{11FC}$), which corresponds to a power of said turbine at a working point (B) where the efficiency is less by 3.5% than the efficiency at an optimum working point (A), under one meter of head and with a runner outlet diameter of one meter, expressed in kilowatts, such that a ratio with a speed of rotation ($N_{11}$) of said turbine under the same conditions, expressed in revolutions per minute, has a value between 0.16 and 0.175.

\* \* \* \* \*